United States Patent
Nurmi et al.

(10) Patent No.: US 9,619,100 B2
(45) Date of Patent: Apr. 11, 2017

(54) METHOD, APPARATUS, AND COMPUTER PROGRAM PRODUCT FOR ADAPTING A CONTENT SEGMENT BASED ON AN IMPORTANCE LEVEL

(75) Inventors: Mikko Antero Nurmi, Tampere (FI); Martin Schüle, Tampere (FI)

(73) Assignee: Nokia Technologies Oy, Espoo (FI)

(*) Notice: Subject to any disclaimer, the term of this patent is extended or adjusted under 35 U.S.C. 154(b) by 325 days.

(21) Appl. No.: 12/871,731

(22) Filed: Aug. 30, 2010

(65) Prior Publication Data

US 2012/0054631 A1 Mar. 1, 2012

(51) Int. Cl.
*G06F 3/0481* (2013.01)

(52) U.S. Cl.
CPC ................... *G06F 3/0481* (2013.01)

(58) Field of Classification Search
CPC ..................................... G06F 3/0481
See application file for complete search history.

(56) References Cited

U.S. PATENT DOCUMENTS

| | | | |
|---|---|---|---|
| 6,002,397 A * | 12/1999 | Jaaskelainen, Jr. ........... | 715/805 |
| 6,320,943 B1 | 11/2001 | Borland | |
| 6,721,953 B1 | 4/2004 | Bates et al. | |
| 6,832,244 B1 | 12/2004 | Raghunandan | |
| 7,167,841 B2 * | 1/2007 | Hatano et al. .................. | 705/56 |
| 7,343,365 B2 * | 3/2008 | Farnham et al. ............ | 715/853 |
| 7,546,550 B1 * | 6/2009 | Buck ............................ | 715/834 |
| 7,551,188 B2 | 6/2009 | Ahokas | |
| 2002/0030667 A1 | 3/2002 | Hinckley et al. | |
| 2003/0195937 A1 | 10/2003 | Kircher, Jr. et al. | |
| 2004/0070627 A1 * | 4/2004 | Shahine et al. ............... | 345/794 |
| 2005/0091604 A1 | 4/2005 | Davis | |
| 2006/0075358 A1 | 4/2006 | Ahokas | |
| 2006/0101351 A1 * | 5/2006 | Cowham ....................... | 715/783 |
| 2006/0129914 A1 * | 6/2006 | Ellis et al. .................... | 715/504 |

(Continued)

FOREIGN PATENT DOCUMENTS

| | | |
|---|---|---|
| CN | 101365200 A | 2/2009 |
| CN | 10 142 0475 A | 4/2009 |

(Continued)

OTHER PUBLICATIONS

International Search Report and Written Opinion for Application No. PCT/IB2011/053598 dated Dec. 22, 2011.

(Continued)

*Primary Examiner* — Ryan Pitaro
(74) *Attorney, Agent, or Firm* — Alston & Bird LLP (57) ABSTRACT

An apparatus may include a data manager configured to manage user contacts or other data segments. The apparatus may further include an importance level determiner configured to determine an importance level for each of the user contacts or other data segments. The importance level may be based on a contextual characteristic, and therefore the apparatus may include a contextual characteristic determiner. Further, the apparatus may include a content segment adaptor configured to adapt a content segment relating to one of the user contacts or other data segments based on the importance level. For example, the content segment adaptor may select the size, color, and/or position of the content segments. Content segments may include avatars, messages, and contact information in some variations.

23 Claims, 6 Drawing Sheets

(56) References Cited

U.S. PATENT DOCUMENTS

| | | | |
|---|---|---|---|
| 2006/0173961 A1 | 8/2006 | Turski et al. | |
| 2007/0143428 A1 | 6/2007 | Kumar et al. | |
| 2007/0300185 A1* | 12/2007 | Macbeth et al. | 715/825 |
| 2008/0155461 A1 | 6/2008 | Ozaki | |
| 2008/0165136 A1 | 7/2008 | Christie et al. | |
| 2008/0201634 A1* | 8/2008 | Gibb | G06F 17/30905 715/256 |
| 2008/0256107 A1* | 10/2008 | Banga et al. | 707/102 |
| 2009/0037832 A1* | 2/2009 | Falchuk et al. | 715/764 |
| 2009/0047934 A1 | 2/2009 | Wassingbo | |
| 2009/0144655 A1 | 6/2009 | Hardy et al. | |
| 2009/0288034 A1* | 11/2009 | Childress | G06F 17/241 715/781 |
| 2009/0295805 A1* | 12/2009 | Ha et al. | 345/426 |
| 2010/0039399 A1 | 2/2010 | Kim | |
| 2010/0058196 A1* | 3/2010 | Krishnan et al. | 715/747 |
| 2010/0269038 A1 | 10/2010 | Tsuda | |
| 2010/0325526 A1* | 12/2010 | Ellis et al. | 715/217 |
| 2011/0072492 A1* | 3/2011 | Mohler et al. | 726/3 |
| 2011/0092227 A1* | 4/2011 | Phukan | G06F 17/3087 455/456.3 |
| 2011/0119593 A1* | 5/2011 | Jacobson et al. | 715/736 |
| 2011/0197140 A1* | 8/2011 | Seeger et al. | 715/739 |
| 2011/0208740 A1* | 8/2011 | Lynch | 707/737 |
| 2012/0047380 A1* | 2/2012 | Nurmi | 713/320 |
| 2012/0254772 A1* | 10/2012 | Blagsvedt et al. | 715/752 |
| 2013/0159408 A1* | 6/2013 | Winn | G06N 99/005 709/204 |

FOREIGN PATENT DOCUMENTS

| | | |
|---|---|---|
| CN | 101464975 A | 6/2009 |
| CN | 101720055 A | 6/2010 |
| CN | 101741951 A | 6/2010 |
| EP | 1 603 066 A1 | 12/2005 |
| EP | 1 622 328 A1 | 2/2006 |
| EP | 1 727 032 A2 | 11/2006 |
| EP | 1 947 596 A1 | 7/2008 |
| EP | 1947596 A1 | 7/2008 |
| JP | 2004-126338 A | 4/2004 |
| JP | 2010-152777 A | 7/2010 |
| WO | WO 2009/112938 A2 | 9/2009 |
| WO | WO-2010/019474 A2 | 2/2010 |
| WO | WO 2010/019474 A2 | 2/2010 |
| WO | WO 2010/024969 A1 | 3/2010 |

OTHER PUBLICATIONS

United States Patent and Trademark Office, Office Action for U.S. Appl. No. 12/871,746, Apr. 10, 2013, 10 pages, USA.
Office Action from Korean Patent Application No. 10-2013-7007880, dated Mar. 27, 2014.
International Search Report and Written Opinion from International Application No. PCT/IB2011/053780, dated Dec. 29, 2011.
International Preliminary Report on Patentability from International Application No. PCT/IB2011/053780, issued Mar. 5, 2013.
Extended European Search Report from related EP Application No. 11821196.0, dated Mar. 14, 2014.
Office Action for U.S. Appl. No. 12/871,746 dated Jan. 1, 2015.
Office Action for corresponding Chinese Application No. 201180049527.8 dated Nov. 18, 2015.
Office Action for corresponding U.S. Appl. No. 12/871,746 dated Oct. 29, 2012.
Office Action for U.S. Appl. No. 12/871,746 dated Jan. 13, 2015.
Office Action for U.S. Appl. No. 12/871,746 dated Apr. 10, 2013.
Office Action for U.S. Appl. No. 12/874,746 dated May 28, 2015.
Notice of Allowance for Chinese Application No. 201180049527.8 dated Apr. 26, 2016.
Office Action for Chinese Application No. 201180049527.8 dated Apr. 1, 2015.
Office Action for U.S. Appl. No. 12/871,746 dated May 28, 2015.
Office Action for European Application No. 11 821 196.0 dated Oct. 29, 2015.
Summons to Attend Oral Proceedings Pursuant to Rule 115(1) EPC from corresponding European Patent Application No. 11821196.0 dated Nov. 4, 2016.
Office Action for U.S. Appl. No. 12/871,746 dated Jan. 3, 2017.

* cited by examiner

METHOD, APPARATUS, AND COMPUTER PROGRAM PRODUCT FOR ADAPTING A CONTENT SEGMENT BASED ON AN IMPORTANCE LEVEL

TECHNOLOGICAL FIELD

An example embodiment of the present invention relates generally to adapting content segments and, more particularly, relates to an apparatus, a method and a computer program product configured to adapt a content segment relating to the user contact based on an importance level of the user contact.

BACKGROUND

In order to provide easier or faster information transfer and convenience, telecommunication industry service providers are continually developing improvements to existing communication networks. As a result, wireless communication has become increasingly more reliable in recent years. Along with the expansion and improvement of wireless communication networks, mobile terminals used for wireless communication have also been continually improving. In this regard, due at least in part to reductions in size and cost, along with improvements in battery life and computing capacity, mobile terminals have become more capable, easier to use, and cheaper to obtain. Due to the now ubiquitous nature of mobile terminals, people of all ages and education levels are utilizing mobile terminals to communicate with other individuals or user contacts, receive services and/or share information, media and other content.

With the proliferation of mobile terminals, communications between users have increased. A user may now receive voice communications, video communications, and/or text communications on a mobile device. Thus, some users may receive a substantial number of communications throughout the course of a day. However, users may not have the necessary time to review and respond to all of the received communications. Users may thereby attempt to manually review the communications to determine those communications which are of greatest importance. However, manual review of communications in this manner may not be optimal in that manual review may still be time consuming and may result in the user overlooking important communications.

BRIEF SUMMARY

A method, apparatus and computer program product are therefore provided to adapt a content segment relating to a user contact or other data segment based on an importance level of the user contact or other data segment.

In an example embodiment, an improved apparatus comprises at least one processor and at least one memory including computer program code, the at least one memory and the computer program code configured to, with the processor, cause the apparatus to determine an importance level of a user contact, adapt a content segment relating to the user contact based on the importance level, and provide for output of the content segment.

In an additional example embodiment a method comprises determining an importance level of a user contact, adapting a content segment relating to the user contact based on the importance level via a processor, and providing for output of the content segment.

In a further example embodiment a computer program product comprises at least one computer-readable storage medium having computer-executable program code portions stored therein, the computer-executable program code portions comprising program code instructions for determining an importance level of a user contact, program code instructions for adapting a content segment relating to the user contact based on the importance level, and program code instructions providing for output of the content segment.

In a further example embodiment an apparatus comprises means for determining an importance level of a user contact, means for adapting a content segment, and means for outputting the content segment. Means for determining an importance level of a user contact may comprise a data manager, an importance level determiner, and/or a processor. Means for adapting a content segment may adapt a content segment relating to the user contact based on the importance level and may comprise a content segment adaptor, and/or the processor. Means for outputting the content segment may comprise a user interface, and/or the processor.

In some embodiments the apparatuses may be further configured to select a position of the content segment based on the importance level and provide for display of the content segment. Also, the apparatus may be configured to position the content segment out of an ordered sequence in instances in which the importance level for the user contact defines a greatest importance level. Additionally, the apparatus may be configured to determine the importance level for the user contact based on a contextual characteristic. The apparatus may further be configured to provide for normalization of the content segment. The apparatus may also be configured to select a color, shape, and/or size of the content segment based on the importance level and provide for display of the content segment. Similar embodiments of the method and computer program product are also provided. Accordingly, such example embodiments of the present invention may adapt a content segment relating to a user contact or other data segment based on an importance level of the user contact to assist a user in identifying important content segments. Thereby, efficiency in browsing for content segments may be improved.

BRIEF DESCRIPTION OF THE SEVERAL VIEWS OF THE DRAWING(S)

Having thus described embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
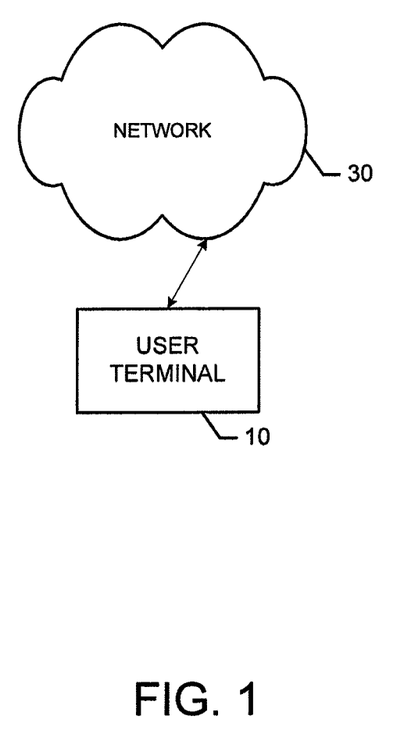
FIG. 1 illustrates a schematic block diagram of a system according to an example embodiment of the present invention.

As indicated above, some embodiments of the present invention may be employed in methods, apparatuses and computer program products configured to adapt a content segment relating to a user contact based on an importance level of the user contact. In this regard, for example, FIG. 1 illustrates a block diagram of a system that may benefit from embodiments of the present invention. It should be understood, however, that the system as illustrated and hereinafter described is merely illustrative of one system that may benefit from an example embodiment of the present invention and, therefore, should not be taken to limit the scope of embodiments of the present invention.

As shown in FIG. 1, a system in accordance with an example embodiment of the present invention may include a user terminal 10. The user terminal 10 may be any of multiple types of fixed or mobile communication and/or computing devices such as, for example, portable digital assistants (PDAs), pagers, mobile televisions, mobile telephones, gaming devices, laptop computers, personal computers (PCs), cameras, camera phones, video recorders, audio/video players, radios, global positioning system (GPS) devices, or any combination of the aforementioned, which employ an embodiment of the present invention.

In some embodiments the user terminal 10 may be capable of communicating with other devices, either directly, or via a network 30. The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Thus, the network 30 may be a cellular network, a mobile network and/or a data network, such as a local area network (LAN), a metropolitan area network (MAN), and/or a wide area network (WAN), for example, the Internet. In turn, other devices such as processing elements (for example, personal computers, server computers or the like) may be included in or coupled to the network 30. By directly or indirectly connecting the user terminal 10 and the other devices to the network 30, the user terminal and/or the other devices may be enabled to communicate with each other, for example, according to numerous communication protocols including Hypertext Transfer Protocol (HTTP) and/or the like, to thereby carry out various communication or other functions of the mobile terminal and the other devices, respectively. As such, the user terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi, ultra-wide band (UWB), Wibree techniques and/or the like and fixed access mechanisms such as digital subscriber line (DSL), cable modems, Ethernet and/or the like. Thus, for example, the network 30 may be a home network or other network providing local connectivity.

In an example embodiment, an apparatus 50 is provided that may be employed by devices performing example embodiments of the present invention. The apparatus 50 may be embodied, for example, as any device hosting, including, controlling or otherwise comprising the user terminal 10. However, embodiments may also be embodied on a plurality of other devices such as for example where instances of the apparatus 50 may be embodied on the network 30. As such, the apparatus 50 of FIG. 2 is merely an example and may include more, or in some cases less, than the components shown in FIG. 2.

Figure 2:
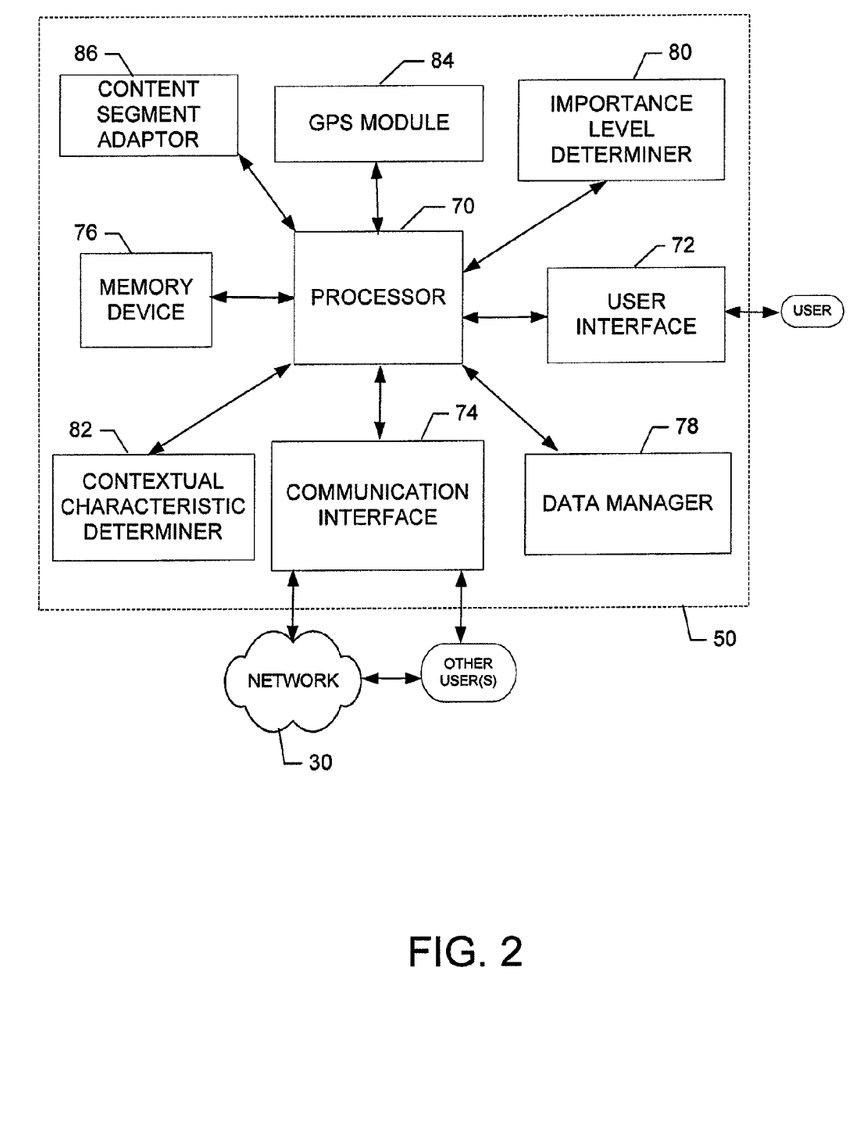
FIG. 2 illustrates a schematic block diagram of an apparatus configured to adapt a content segment relating to a user contact based on an importance level of the user contact according to an example embodiment of the present invention.

With further regard to FIG. 2, the apparatus 50 may be configured to adapt a content segment relating to a user contact based on an importance level of the user contact. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, files, applications, instructions or the like. For example, the memory device 76 could be configured to buffer input data for processing by the processor 70. Additionally or alternatively, the memory device 76 could be configured to store instructions for execution by the processor 70.

As mentioned above, the apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 70 may be embodied in a number of different ways. For example, the processor 70 may be embodied as one or more of various processing means such as a coprocessor, a microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a hardware accelerator, a special-purpose computer chip, or the like. In an example embodiment, the processor 70 may be configured to execute instructions stored in the memory device 76 or otherwise accessible to the processor. Alternatively or additionally, the processor 70 may be configured to execute hard coded functionality. As such, whether configured by hardware or software methods, or by a combination thereof, the processor 70 may represent an entity (for example, physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor to perform the algorithms and/or operations described herein when the instructions are executed. However, in some cases, the processor 70 may be a processor of a specific device (for example, a mobile terminal or network device such as a server) adapted for employing embodiments of the present invention by further configuration of the processor by instructions for performing the algorithms and/or operations described herein. The processor 70 may include, among other things, a clock, an arithmetic logic unit (ALU) and logic gates configured to support operation of the processor.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 74 may include hardware and/or software for supporting communication mechanisms such as BLUETOOTH®, Infrared, UWB, WiFi, and/or the like, which are being increasingly employed in connection with providing home connectivity solutions.

The user interface 72 may be in communication with the processor 70 to receive an indication of a user input at the user interface and/or to provide an audible, visual, mechanical or other output to the user. As such, the user interface 72 may include, for example, a keyboard, a mouse, a joystick, a display, a touch screen, a microphone, a speaker, or other input/output mechanisms.

The processor 70 may comprise user interface circuitry configured to control at least some functions of one or more elements of the user interface 72, such as, for example, the speaker, the ringer, the microphone, the display, and/or the like. The processor 70 and/or user interface circuitry comprising the processor 70 may be configured to control one or more functions of one or more elements of the user interface 72 through computer program instructions (for example, software and/or firmware) stored on a memory accessible to the processor 70 (for example, memory device 76, and/or the like).

In some embodiments the apparatus 50 may further include a data manager 78. The processor 70 or other circuitry may be embodied as, include or otherwise control the data manager 78. The data manager 78 may be configured to manage a plurality of data segments which may be associated, for example, with the apparatus 50 and/or the user. The data segments are generally described herein as comprising user contacts which the apparatus 50 may store or otherwise have access to. However, in other embodiments the data segments may relate to various other types of data and information which have content segments related thereto and which may be stored on or otherwise accessible to the apparatus 50. In this regard, data segments, as used herein, may comprise any information which may be organized based on importance.

Returning to the embodiment in which the data segments comprise user contacts, user contacts may comprise persons, businesses, or other entities for which contact information may be associated therewith. For example, user contacts may have associated therewith contact information such as names, addresses, phone numbers, fax numbers, email addresses, and photos of the user contacts or other avatars. The data manager 78 may manage the user contacts and other data segments by, for example, allowing a user to upload, create, edit, and access the user contacts and other data segments.

In some embodiments the apparatus 50 may further include an importance level determiner 80. The processor 70 or other circuitry may be embodied as, include or otherwise control the importance level determiner 80. The importance level determiner 80 may be configured to determine an importance level for a user contact or other data segment. In this regard, the user contacts may be analyzed to determine how important the user contacts are to the user. In some embodiments the user importance level may be binary. In this regard, the user importance level may be either important, or unimportant. However, in other embodiments the user importance levels may comprise multiple levels, or a ranked order of importance for each of the user contacts.

In some embodiments the importance levels for the user contacts may be selected by the user. For example, the importance level determiner 80 may ask the user to rank the user contacts based on importance level or ask the user to select an importance level. In such embodiments determining the importance level of a user contact may comprise receiving a user input comprising the importance level.

In other embodiments the importance level determiner 80 may determine the importance levels for the user contacts without receiving a user input comprising the importance levels. In this regard, the importance level determiner 80 may employ a variety of techniques and methods to determine the importance levels. For example, the importance level may be based on communication frequency, amount of communication around a certain time, amount of communication at the current location of the user/apparatus 50 with different people, etcetera. By way of example, the importance level determiner 80 may record and analyze how often the user communicates with each of the user contacts through email, instant messaging (IM), short messaging service (SMS), multimedia messaging service (MMS), voice communications, video communications, and/or other communication mediums. The importance level determiner 80 may additionally or alternatively determine the importance levels of the user contacts based on the duration of communications, the length of text-based communications, and/or the data usage associated with exchanging communications with the user contacts. In this regard, frequent and lengthy communications with user contacts may be indicative of high importance levels for the user contacts. In some embodiments the importance level determiner 80 may weight outgoing communications more heavily than incoming communications. For example, a user may tend to initiate contact with user contacts of higher importance to the user. However, in other embodiments the importance level determiner 80 may equally weight incoming and outgoing communications or weight incoming communications more heavily. Further, in some embodiments the importance level determiner 80 may weight more recent communications more heavily than older communications. Thereby, older communications may have less of an effect, or no effect, on the importance determination.

Further, in some embodiments the importance level determiner 80 may alternatively or additionally determine importance levels by determining the relationship between the user and the user contacts. For example, the user may input contact information that directly describes the user contacts in some embodiments and the importance level determiner 80 may determine the importance levels by reviewing this information. By way of example, the user may classify or otherwise describe the user contacts as relatives, friends, business associates, etcetera. In other embodiments the user may provide greater details with respect to his or her relationship to the user contacts. For example, a contact may be described as the user's father, or boss. In some embodiments the importance level determiner 80 may determine importance levels by checking communication histories in different social networking services, or by checking to see if the user is friends with a person only through one or more of the social networking services.

However, in some embodiments the importance level determiner 80 may determine the relationship of the user to each of the user contacts without relying on direct user input of this information. For example, the importance level determiner 80 may review communications between the user and the user contacts and look for keywords. In some embodiments the importance level determiner 80 may review salutations and valedictions appearing in messages. Thereby, for example, if the valediction "Love, Mom" appears in one of the user's communications to a user contact, the importance level determiner 80 may determine that this user contact should have a high importance level.

Also, in some embodiments the importance level determiner 80 may determine that groups of user contacts are of importance. The groups of user contacts may be user defined and/or the groups may be determined, for example, by reviewing communications as discussed above. Thereby, for example, the importance level determiner 80 may determine that communications from a soccer team which the user is a part of are important before an upcoming soccer game which is scheduled.

In other embodiments the importance level determiner 80 may determine the importance level based in part on a received user input and based in part on a calculated importance level that may be, for example, calculated using the above-described methods. For example, the user may directly specify the importance level of some user contacts, and the importance level determiner 80 may calculate the importance level for the other user contacts. By way of further example, when the user indicates that a particular user contact is of importance, and this user contact is part of a group of user contacts, the importance level determiner 80 may determine that other user contacts in the group are of importance. Also, in some embodiments the importance level determiner 80 may allow the user to override a calculated importance level for a user contact. For example, although a user may receive frequent emails from a user contact that is a business associate, the user contact may not be important to the user. For example, the emails may relate to daily office roles describing who is out of the office, which may be of little importance to the user. Thereby, the importance level determiner 80 may allow the user to override determined importance levels in some embodiments.

Further, in some embodiments the importance level determiner 80 may learn based on whether the user selects content segments relating to the user contact which is determined to be of importance. For example, if the content segments relating to the user contact which the importance level determiner 80 determines to be importance are not selected or are otherwise ignored multiple times, the importance level determiner may then determine that the user contact is of a lower level of importance than previously calculated. Thereby, the importance level determiner 80 may adjust the importance levels based on how the user responds to the determined importance levels.

Accordingly, the importance level determiner 80 may employ a variety of methods to determine the importance level for the user contacts such as those embodiments described above as well as various other methods that are not described herein. Further, in some embodiments the method by which the importance level determiner 80 determines the importance levels may be user selectable. Thereby, for example, the user may select the method that he or she believes may be more likely to most accurately determine the importance level he or she associates with each of the user contacts.

Additionally, in some embodiments the importance level determiner 80 may determine the importance level for each user contact or other data segment based on one or more contextual characteristics of the user, a data segment (e.g. a user contact), and/or the apparatus 50. Thus, the apparatus 50 may further include a contextual characteristic determiner 82, as illustrated in FIG. 2, which is configured to determine a contextual characteristic. The processor 70 or other circuitry may be embodied as, include or otherwise control the contextual characteristic determiner 82.

Contextual characteristics may include the present time, location, activity, etcetera of the user, the apparatus 50, and/or the user contacts or other data segments. In this regard, the importance levels for user contacts may change over time as the contextual characteristics change. Information relating to the location of the user may, for example, be provided by a GPS module 84, though location information may additionally or alternatively be provided through other means such as triangulation using cell phone towers. The processor 70 or other circuitry may be embodied as, include or otherwise control the GPS module 84. Thus, for example, the contextual characteristic determiner 82 may determine that the user is presently near a user contact based on stored user contact information or shared location information. In such instances, the importance level determiner 80 may determine that the user contact has a high importance level at that point in time based on proximity. For example, if the user receives a call from a friend while the user happens to be near the friend, the user may be more inclined to receive the call because of the possibility for meeting in person with the friend.

By way of further example, the contextual characteristic determiner 82 may determine when the user is sleeping or working or determine contextual characteristics indicative of these activities and provide this information to the importance level determiner 80. For example, the contextual characteristic determiner 82 may determine that the user is home at night based on time and location information. These contextual characteristics may then be used by the importance level determiner 80 to determine the importance level of the user contacts given these contextual characteristics. For example, if in previous circumstances with similar determined contextual characteristics the user has only answered phone calls or responded to messages from certain ones or types of the user contacts, then the importance level determiner 80 may determine that those user contacts have higher importance levels than the other user contacts. Accordingly, in some embodiments the importance level determiner 80 may determine the importance levels of the user contacts based on contextual characteristics, as may be determined by the contextual characteristic determiner 82. Thus, in some embodiments the importance levels may be determined for a variety of contextual characteristics such as user/apparatus location, time of the day, usage history of the apparatus, etcetera. Thus, the determined importance levels of the user contacts may change as the contextual characteristics change in some embodiments.

In some embodiments the apparatus 50 may further include a content segment adaptor 86. The processor 70 or other circuitry may be embodied as, include or otherwise control the content segment adaptor 86. The content segment adaptor 86 may be configured to adapt a content segment relating to the user contact or other data segment based on the importance level. Content segments, as used herein, may include a variety of embodiments of content that the apparatus 50 may output using the user interface 72. For example, content segments may include ring tones and other audio output, vibrations, and displayed content.

In this regard, various forms of content segments may be adapted by the content segment adaptor 86 based on the importance level of the user contact or other data segment to which the content segment relates. By way of example, when the apparatus 50 receives a message, phone call, or other communication from a user contact with a high importance level as determined by the importance level determiner 80, the content segment adaptor 86 may adapt the ring tone to indicate that the call is important. Similarly, the content segment adaptor 86 may adapt a vibration that is outputted when a communication is received. For example, when a communication is received from a high importance user contact, the content segment adaptor 86 may adapt the vibration to a series of rapid vibrations. Further, in some embodiments the content segment adaptor 86 may adapt the content segments such that the same ring tone and/or vibration is outputted by the apparatus 50 for a particular user contact regardless of the communication method. Additionally, note that the user may specify the types of ring tones and/or types of vibrations for various importance levels or user contacts, or the content segment adaptor 86 may choose the ring tones and/or vibrations in some embodiments.

Figure 4:
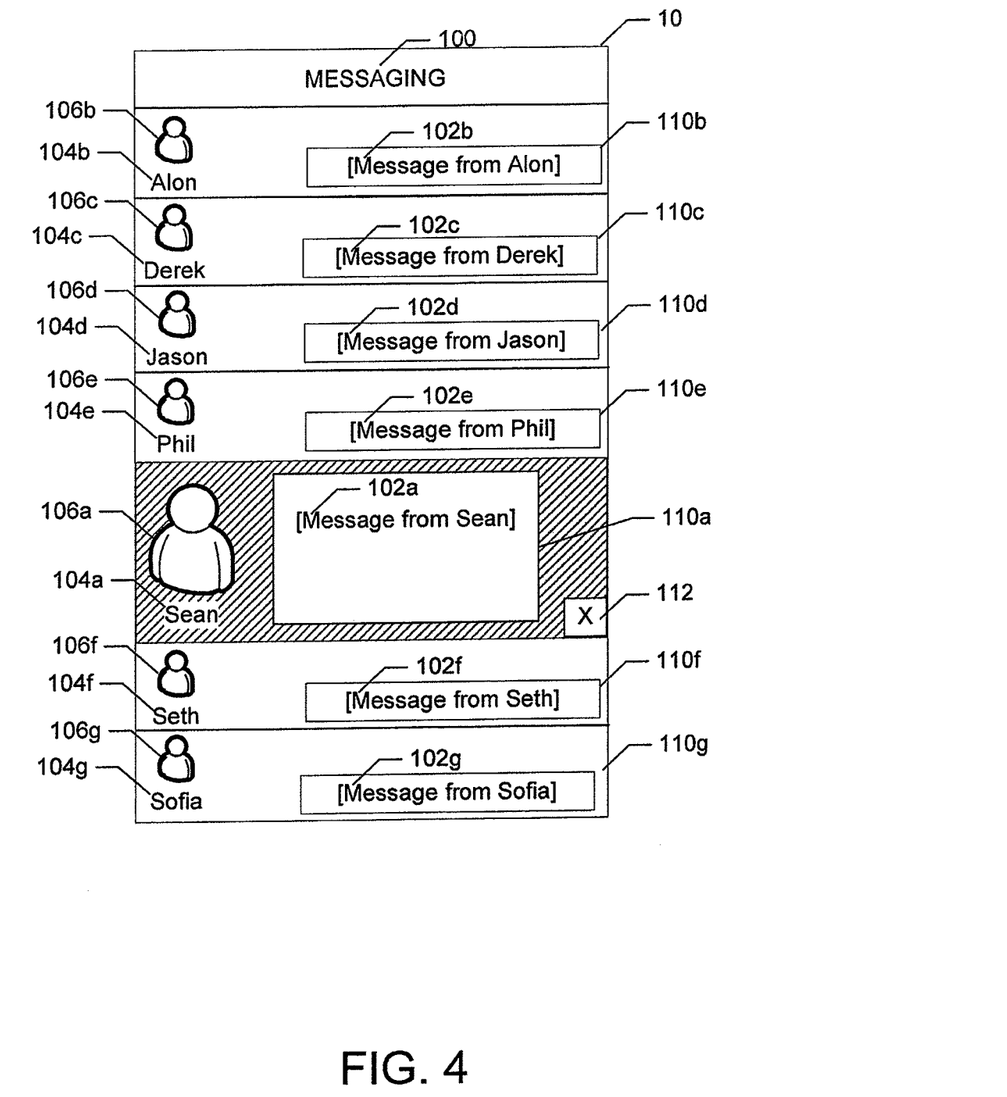
FIG. 4 illustrates an embodiment of a user terminal employing the apparatus of FIG. 2 to adapt a content segment in a messaging application while positioning the content segment in an ordered sequence according to an example embodiment of the present invention.
Figure 5:
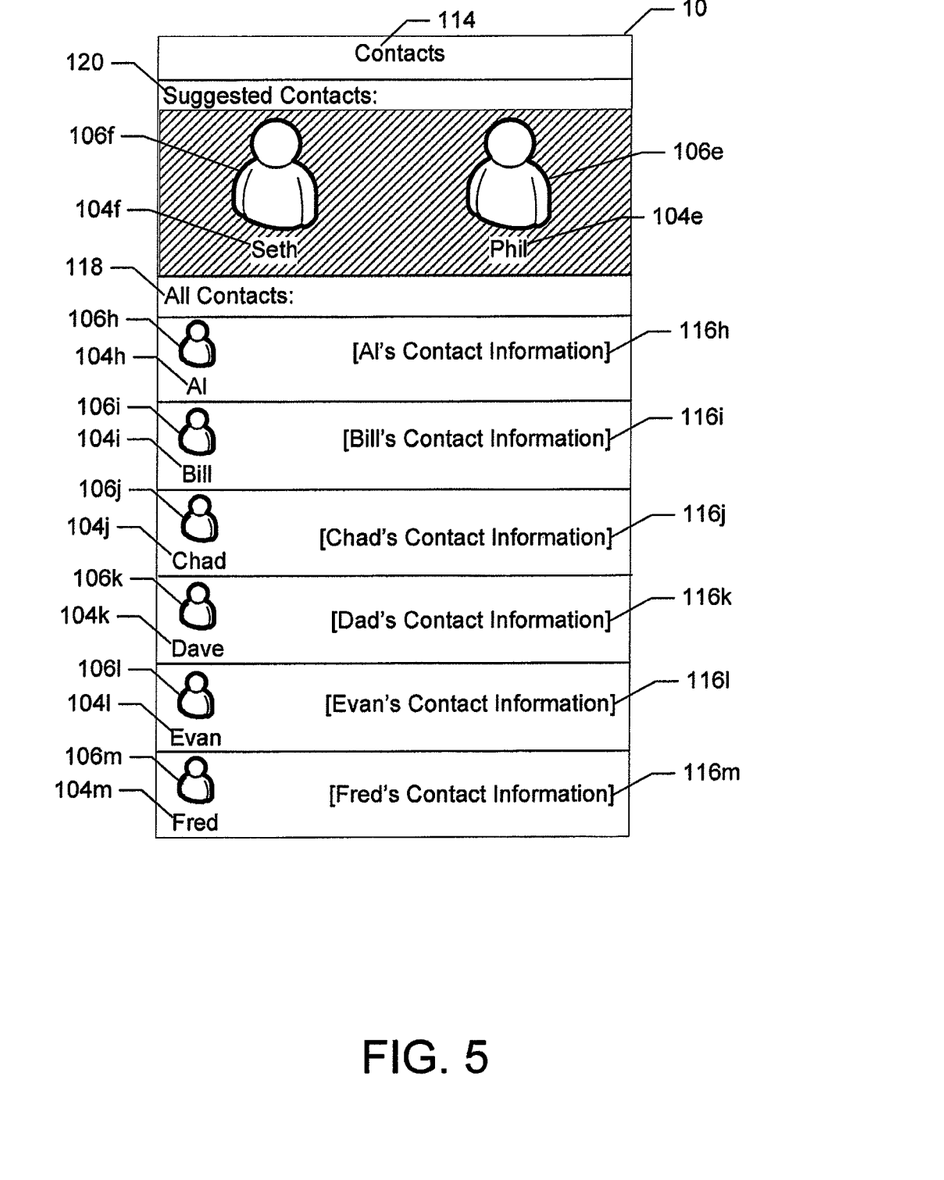
FIG. 5 illustrates an embodiment of a user terminal employing the apparatus of FIG. 2 to adapt a content segment in a contacts application according to an example embodiment of the present invention.

In a further embodiment the content segment adaptor 86 may adapt content elements that are displayed, for example, by the user interface 72. In this regard, the content segment adaptor 86 may in various embodiments adapt the size of a content element, the amount or type of displayed information comprising the content element, the position of the content element, visual effects such as the color or glow of the content segment, etcetera. For example, FIGS. 3-5 illustrate embodiments of the apparatus 50 when the apparatus is embodied in the user terminal 10.

Figure 3:
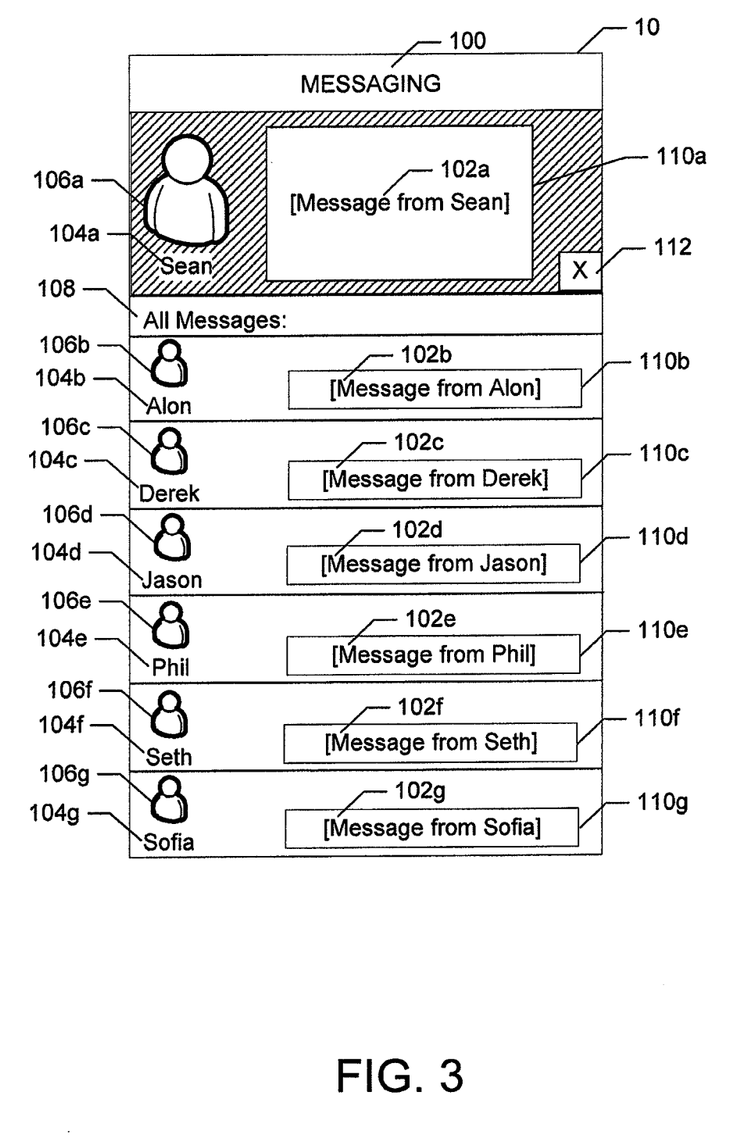
FIG. 3 illustrates an embodiment of a user terminal employing the apparatus of FIG. 2 to adapt a content segment in a messaging application to be positioned out of an ordered sequence according to an example embodiment of the present invention.

FIG. 3 illustrates the user terminal 10 when the user terminal is running a messaging application 100. In this regard, the user terminal 10 is illustrated providing for display of content segments comprising messages 102*a-g* received from various user contacts 104*a-g* and avatar's 106*a-g* corresponding to the user contacts. In some embodiments the messaging application 100 may generally position the messages 102*a-g* in an ordered sequence, as illustrated in the all messages section 108 of the messaging application. The messages 102*b-g* and avatars 106*b-g* are shown alphabetically positioned in an ordered sequence based on the names of the user contacts 104*b-g*. In other embodiments the messages 102*b-g* may be generally positioned in an ordered sequence based on time of receipt of the messages or other factors.

However, the message from Sean 104*a* and Sean's corresponding avatar 106*a* are positioned out of sequence at the top of the display. In this regard, in some embodiments the content segment adaptor 86 may position content segments out of an ordered sequence in instances in which the importance level for the user contact defines a greatest importance level. For example, in the illustrated embodiment the importance level determiner 80 may have determined that of the user contacts 104*a-g*, Sean is the most important user contact by, for example, employing one of the routines described above. In some embodiments the importance level determiner 80 may determine the most important user contact from a portion of the entirety of the user contacts. For example, the importance level determiner 80 may determine that Sean is the most important user contact of the user contacts that have sent messages to the user terminal 10 within the past week. Thus, in some embodiments the user contact that defines the greatest importance level may not have the absolute greatest importance level of all the user contacts, but rather may define the greatest importance level of a subset of the user contacts.

As further illustrated in FIG. 3, in some embodiments the content segment adaptor 86 may select a color of the content segment based on the importance level. In this regard, the background associated with the message from Sean 102a is illustrated as being of a different color than the background associated with the other messages 102b-g. For example, the background for the message from Sean 102a may be selected to be of greater visibility than the color of the background of the other messages 102b-g. In some embodiments the text of the message from Sean 102a may additionally or alternatively be selected to be of a different color or shape than the other messages 102b-g. For example, the message from Sean 102a may be displayed as being displaced from the other messages. For example the message from Sean may appear in front of the other messages, for example, when the apparatus 50 comprises a three-dimensional ("3-D") autostereoscopic screen. The content segment adaptor 86 may select colors, shapes and other visual effects for various other portions of the content segments as may be understood by one having skill in the art that may be used to distinguish content segments based on the importance levels.

As additionally illustrated in FIG. 3, in some embodiments the content segment adaptor 86 may select a size of the content segment based on the importance level. In this regard, FIG. 3 illustrates the user terminal 10 displaying the message from Sean 102a in a larger text box 110a than the text boxes 110b-g for the messages 102b-g from the other user contacts 104b-g. The font of the text may also be different, for example, in terms of size, italics, bold, etcetera. Further, in the illustrated embodiment the size of the avatar 106a for Sean 104a is sized to be larger than the avatars 106b-g for the other user contacts 104b-g. Thus, the size of the avatars 106 may depend on the importance level and therefore the avatars may each define different sizes based on the importance levels (e.g. a range of bigger avatars for more important contacts and a range of smaller avatars for less important contacts). In some embodiments the content segment adaptor 86 may select the size of the message box for the user contact defining the greatest important level so as to display the entire message in the message box, whereas the message boxes for the other user contacts may be sized such that the messages may be truncated if they exceed a certain size. However, the content segment adaptor 86 may select the sizes of the content segments using various other methods in other embodiments as may be understood by one having skill in the art. For example, in some embodiments the importance level for each user contact may be determined and the content segments relating thereto may each be adapted based on the importance level, whereas in other embodiments a smaller number of the content segments may be adapted so as to highlight their importance levels. In other embodiments only those user contacts which exceed a threshold importance level may have their associated content segments adapted. Thus, in some instances no content segments may be highlighted or otherwise adapted. Further, in other embodiments only those contact segments relating to user contacts which are determined to be relatively unimportant may be adapted. This may be useful, for example, when the user wants to delete unwanted content segments relating to unimportant user contacts.

FIG. 3 further illustrates an embodiment in which the content segment adaptor 86 provides for normalization of the content segment. Normalization, as used herein, refers to adapting content segments such that the outputted characteristics of the content segment no longer relate to the determined importance level of the content segments. In this regard, the user may select a normalization button 112 or otherwise input a command to instruct the content segment adaptor 86 to normalize the content segment. In other embodiments the content segment adaptor 86 may automatically normalize content segments after they have been scrolled through or viewed. When the content segment normalizes, the content segment adaptor 86 may adapt the content segment to have the characteristics of the other content segments, for example, the size of the text box 110a and the avatar 106a may shrink to the sizes of the other text boxes 110b-g and avatars 106b-g. Further, the background and text color may adapt to the same color as the other content segments. Also, the position of the content segment may be adjusted. For example, the message from Sean 102a and related content may be moved to a position that fits within the ordered sequence. Thus, the message from Sean 102a may move to a position between the message from Phil 102e and the message from Seth 102f in embodiments in which the messages are arranged alphabetically based on the names of the user contacts. However, as may be understood by one having skill in the art, various other methods of normalizing content segments may be employed by the content segment adaptor 86. For example, in some embodiments content segments may automatically normalize after a user views the content segment, or after a certain period of time.

FIG. 4 illustrates an alternate embodiment of the user terminal 10 when the user terminal is operating the messaging application 100 and in which Sean 104a has again been determined by the importance level determiner 80 to be the most important contact. However, in this embodiment, the position of the content segment relating to Sean 104a has not been adapted by the content segment adaptor 86 based on the importance level. Accordingly, in this embodiment when the user selects the normalization button, the content segment adaptor 86 may not need to change the position of the content segment relating to Sean 104a.

FIG. 5 illustrates an embodiment of the user terminal 10 when operating a contacts application 114. The contacts application 114 may display a list of user contacts 104e, f, and h-m with associated user contact information 116e, f, and h-m and/or associated avatar's 106e, f, h-m. As described above, the user contact information 116e, f, and h-m may include phone numbers and other information associated with the user contacts 104e, f, and h-m. As illustrated, the contacts application 114 may display an all contacts section 118 under which an ordered sequence of the user contacts 104h-m may be displayed. However, one or more user contacts 104e, f may be displayed in a separate suggested contacts section 120. In this regard, the content segment adaptor 86 may position content segments based on the importance level and in some embodiments position one or more content segments defining a greatest importance level out of an ordered sequence, as described above. The content segments illustrated in FIG. 5 comprise avatars 106e, f that are displayed out of the alphabetically ordered sequence of the all contacts section 118 at the top of the display in the suggested contacts section 120. Thus, in some embodiments there may be more than one user contact 106e, f defining a greatest importance level.

As previously discussed, the content segment adaptor 86 may also select a size and color of the content segments based on the importance level. Thus, as illustrated, the suggested contacts section 120 may have a different color than the all contacts section 118, and further, the avatars 106*e*, *f*in the suggested contacts section may be larger than the avatars 106*h-m* in the all contacts section. Accordingly, content segments may be adjusted within the context of the contacts application 114 and various other applications.

Although not shown, content segments may also be adapted based on importance levels within the context of email applications, phone and phone log applications, etcetera. Further, content segments may be adapted in map, calendar, photo, and other applications. For example, content segments showing the location of a user contact or an item related to the user contact on a map may be adapted based on the importance level of the user contact. Calendar items relating to user contacts, such as an event that a user contact is expected to attend may be adapted based on the importance level of the user contact. Further, photos taken by, or including a user contact therein may be adapted based on the importance levels of the user contact. Additionally, in some embodiments new arriving event notifications and missed events displayed, for example, in a status menu may be adapted based on the importance levels of user contacts related thereto. Accordingly, various types of content segments may be adapted in a variety of applications and programs in a variety of different manners based on the importance levels of user contacts. In this regard, the embodiments described and illustrated have been provided for example purposes only.

Figure 6:
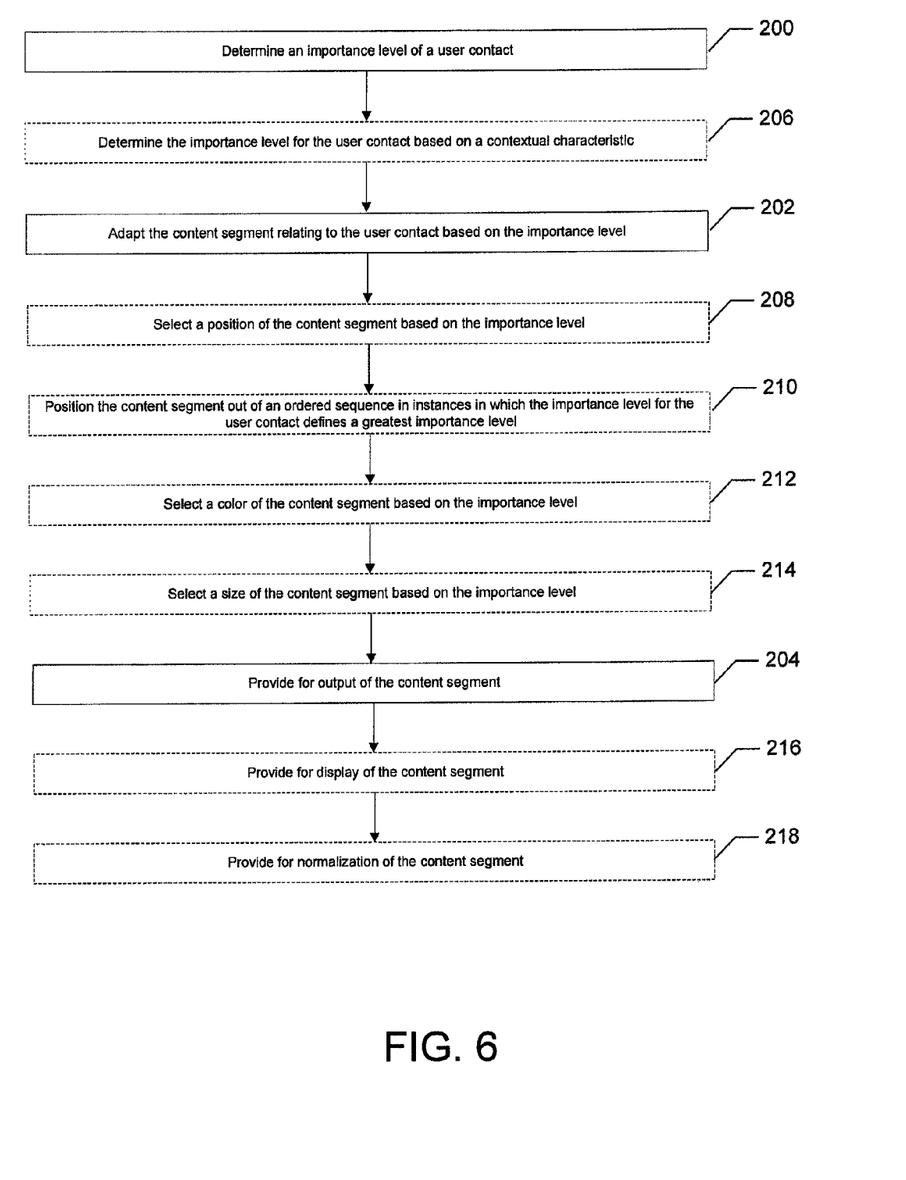
FIG. 6 illustrates a flowchart of the operations performed in adapting a content segment relating to a user contact based on an importance level of the user contact according to an example embodiment of the present invention.

In terms of methods associated with embodiments of the present invention, the above-described apparatus 50 or other embodiments of apparatuses may be employed. In this regard, FIG. 6 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by a computer program product including computer program instructions. In this regard, the computer program instructions which embody the procedures described above may be stored by a memory device and executed by a processor of an apparatus. As will be appreciated, any such computer program instructions may be loaded onto a computer or other programmable apparatus (for example, hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method includes determining an importance level of a user contact at operation 200. Further, the method may include adapting a content segment relating to the user contact based on the importance level at operation 202. Additionally, the method may include providing for output of the content segment at operation 204.

In some embodiments, certain ones of the above-described operations (as illustrated in solid lines in FIG. 6) may be modified or further amplified. In some embodiments additional operations may also be included (some examples of which are shown in dashed lines in FIG. 6). It should be appreciated that each of the modifications, optional additions or amplifications may be included with the above-described operations (200-204) either alone or in combination with any others among the features described herein. As such, each of the other operations as will be described herein may be combinable with the above-described operations (200-204) either alone or with one, more than one, or all of the additional operations in any combination.

For example, the method may further comprise determining the importance level for the user contact based on a contextual characteristic at operation 206. The method may additionally include selecting a position of the content segment based on the importance level at operation 208. Accordingly, the method may further include positioning the content segment out of an ordered sequence in instances in which the importance level for the user contact defines a greatest importance level at operation 210. Also, the method may comprise selecting a color of the content segment based on the importance level at operation 212 and/or selecting a size of the content segment based on the importance level at operation 214. Thus, for example, in some embodiments the method may further comprise providing for display of the content segment at operation 216. The method may additionally comprise providing for normalization of the content segment at operation 218.

In an example embodiment, an apparatus for performing the method of FIG. 6 and other methods described above may comprise a processor (for example, the processor 70) configured to perform some or each of the operations (200-218) described above. The processor may, for example, be configured to perform the operations (200-218) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-218 may comprise, for example, the processor 70, the user interface 72, the communication interface 74, the data manager 78, the importance level determiner 80, the contextual characteristic determiner 82, the GPS module 84, and/or the content segment adaptor 86, as described above. However, the above-described portions of the apparatus 50 as they relate to the operations of the method illustrated in FIG. 6 are merely examples, and it should be understood that various other embodiments may be possible.

In some embodiments the operation 200 of determining an importance level of a user contact may be conducted by means (e.g. means for determining an importance level of a user contact), such as the data manager 78, the importance level determiner 80, and/or the processor 70. Further, the operation 202 of adapting the content segment relating to the user contact based on the importance level may be conducted by means (e.g. means for adapting a content segment), such as the content segment adaptor 86, and/or the processor 70. Additionally, the operation 204 of providing for output of the content segment may be conducted by means (e.g. means for outputting the content segment), such as the user interface 72, and/or the processor 70.

Also, the operation 206 of determining the importance level for the user contact based on a contextual characteristic may be conducted by means, such as the data manager 78, the contextual characteristic determiner 82, the GPS module 84, the importance level determiner 80, and/or the processor 70. Further, the operation 208 of selecting a position of the content segment based on the importance level and the operation 210 of positioning the content segment out of an ordered sequence in instances in which the importance level for the user contact defines a greatest importance level may be conducted by means, such as the importance level determiner 80, the content segment adaptor 86, and/or the processor 70. Additionally, the operation 212 of selecting a color of the content segment based on the importance level and the operation 214 of selecting a size of the content segment based on the importance level may be conducted by means, such as the content segment adaptor 86, and/or the processor 70. Also, the operation 216 of providing for display of the content segment may be conducted by means, such as the user interface 72, and/or the processor 70. Further, the operation 218 of providing for normalization of the content segment may be conducted by means, such as the user interface 72, the content segment adaptor 86, and/or the processor 70.

Note that although the method and apparatus are generally described above in terms of adapting content segments relating to user contacts, in other embodiments the content segments may relate to other types of data segments. In this regard, as mentioned above, data segments may comprise any information which may be organized based on importance. Accordingly, the examples provided herein relating to user contacts should not be considered to be limiting.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the processor, cause the apparatus to:
   determine an importance level of a user contact based on a detected contextual characteristic;
   adapt a content segment relating to the user contact based on the importance level, wherein adapting comprises distinguishing the content segment from at least one other content segment by causing the content segment to be positioned out of sequence in an otherwise ordered sequence;
   provide for output of the content segment;
   receive an indication of a user input to normalize the content segment; and
   in response to the user input to normalize the content segment, normalize the content segment such that the content segment is no longer distinguished from the at least one other content segment by causing the content segment to be positioned in sequence within an ordered sequence and the content segment remains concurrently displayed with the at least one other content segment.

2. The apparatus of claim 1, further configured to:
   select a position of the content segment based on the importance level; and
   provide for display of the content segment.

3. The apparatus of claim 2, further configured to position the content segment out of an ordered sequence in instances in which the importance level for the user contact defines a greatest importance level.

4. The apparatus of claim 1, further comprising user interface circuitry configured to:
   facilitate user control of at least some functions of the apparatus through use of a display; and
   cause at least a portion of a user interface of the apparatus to be displayed on the display to facilitate user control of at least some functions of the apparatus.

5. The apparatus of claim 1, wherein the normalizing is performed in response to a user action.

6. The apparatus of claim 1, wherein the normalizing is performed in response to a passing of a predetermined amount of time.

7. The apparatus of claim 1, wherein the normalizing is performed in response to an explicit indication to normalize the content segment.

8. The apparatus of claim 1, wherein the contextual characteristic is based on a present time.

9. The apparatus of claim 1, wherein the contextual characteristic is based on a present location of the user contact.

10. The apparatus of claim 1, wherein the contextual characteristic is based on an activity of the user contact.

11. The apparatus of claim 1, wherein the content segment is adapted in response to receiving a communication associated with the user contact.

12. The apparatus of claim 1, wherein distinguishing the content segment comprises taking the content segment out of an ordered sequence.

13. The apparatus of claim 1, wherein the apparatus is caused to provide for output of the content segment by providing for output of the content segment by a visual display.

14. The apparatus of claim 1, wherein the apparatus is caused to provide for output of the content segment by providing for audio output of the content segment.

15. The apparatus of claim 1, wherein the apparatus is caused to provide for output of the content segment by providing for mechanical output of the content segment.

16. A method, comprising:
   determining an importance level of a user contact based on a detected contextual characteristic;
   adapting a content segment relating to the user contact based on the importance level via a processor, wherein adapting comprises distinguishing the content segment from at least one other content segment by causing the content segment to be positioned out of sequence in an otherwise ordered sequence;
   providing for output of the content segment;
   receiving an indication of a user input to normalize the content segment; and
   in response to the user input to normalize the content segment, normalizing the content segment such that the content segment is no longer distinguished from the at least one other content segment by causing the content segment to be positioned in sequence within an ordered sequence and the content segment remains concurrently displayed with the at least one other content segment.

17. The method of claim 16, further comprising:
   selecting a position of the content segment based on the importance level; and
   providing for display of the content segment.

18. The method of claim 17, further comprising positioning the content segment out of an ordered sequence in instances in which the importance level for the user contact defines a greatest importance level.

19. The method of claim 16, further comprising:
   selecting a size of the content segment based on the importance level; and
   providing for display of the content segment.

20. A computer program product comprising at least one non-transitory computer-readable storage medium having computer-executable program code portions stored therein, the computer-executable program code portions comprising:
   program code instructions for determining an importance level of a user contact based on a detected contextual characteristic;
   program code instructions for adapting a content segment relating to the user contact based on the importance level, wherein adapting comprises distinguishing the content segment from at least one other content segment by causing the content segment to be positioned out of sequence in an otherwise ordered sequence;
   program code instructions providing for output of the content segment;
   program code instructions providing for receiving an indication of a user input to normalize the content segment; and
   program code instructions for, in response to the user input to normalize the content segment, normalizing the content segment such that the content segment is no longer distinguished from the at least one other content segment by causing the content segment to be positioned in sequence within an ordered sequence and the content segment remains concurrently displayed with the at least one other content segment.

21. The computer program product of claim 20, further comprising:
   program code instructions for selecting a position of the content segment based on the importance level; and
   program code instructions providing for display of the content segment.

22. The computer program product of claim 21, further comprising program code instructions for positioning the content segment out of an ordered sequence in instances in which the importance level for the user contact defines a greatest importance level.

23. The computer program product of claim 20, further comprising:
   program code instructions for selecting a color of the content segment based on the importance level; and
   program code instructions providing for display of the content segment.

\* \* \* \* \*